US006687971B2

United States Patent
Nakamura

(10) Patent No.: US 6,687,971 B2
(45) Date of Patent: Feb. 10, 2004

(54) VEHICLE BODY TRANSFER MACHINE AND METHOD THEREOF

(75) Inventor: Setsuo Nakamura, Sagamihara (JP)

(73) Assignee: Nissan Motor Co., Ltd., Yokohama (JP)

(*) Notice: Subject to any disclaimer, the term of this patent is extended or adjusted under 35 U.S.C. 154(b) by 150 days.

(21) Appl. No.: 10/086,777

(22) Filed: Mar. 4, 2002

(65) Prior Publication Data

US 2002/0124377 A1 Sep. 12, 2002

(30) Foreign Application Priority Data

Mar. 12, 2001 (JP) ......................................... 2001-068039

(51) Int. Cl.[7] .......................... B21D 39/03; B23P 11/00; B23P 19/00; B25B 27/14; B23Q 7/00
(52) U.S. Cl. .............................. 29/430; 29/428; 29/799; 29/822; 29/281.1; 29/559
(58) Field of Search ................................ 29/430, 281.4, 29/791, 799, 822, 428, 429, 466, 467, 468, 33 P, 703, 709, 711, 712, 721, 281.1, 281.6, 559; 219/121.6, 121.63, 121.64, 121.85

(56) References Cited

U.S. PATENT DOCUMENTS 5,073,022 A * 12/1991 Pistor et al. ................. 352/223

6,564,440 B2 * 5/2003 Oldford et al. ........... 29/407.01

FOREIGN PATENT DOCUMENTS

JP          2745841         2/1998

* cited by examiner

*Primary Examiner*—John C. Hong
(74) *Attorney, Agent, or Firm*—Foley & Lardner

(57) ABSTRACT

A vehicle body transfer machine transfers a vehicle body along a transfer path by using a transfer truck with which the vehicle body is supported, wherein the transfer truck is returned to an initial starting position of the transfer path for a repeated use when transfer of the vehicle body is terminated. The vehicle body transfer machine comprises a jig change-over stage located before the initial starting position of the transfer path, a plurality of locator jigs including an upwardly directed locating pin, a plurality of lock units, an unlock-operating unit, and a jig change-over unit including a socket portion engageable with the locating pin of the corresponding one of the plurality of locator jigs. The socket portion is moveable toward the locating pin to be brought into engagement therewith under a first unlock condition established when the unlock-operating unit unlock-operates the plurality of lock units, which is correlated with the horizontal two directions, of the corresponding one of the plurality of locator jigs to perform a relative positioning in the two horizontal directions between the jig change-over unit and the corresponding one of the plurality of locator jigs.

10 Claims, 11 Drawing Sheets

VEHICLE BODY TRANSFER MACHINE AND METHOD THEREOF

BACKGROUND OF THE INVENTION

The present invention relates to a vehicle body transfer machine and a method thereof for use in a vehicle body assembly line of an automobile and more particularly, to a vehicle body transfer machine of a general-purpose type and a method thereof specifically suited for transferring vehicle bodies of plural vehicle's models in a so-called mixed flow manufacturing system.

Japanese Patent Publication No. 2745841 discloses a vehicle body transfer machine of a general-purpose type.

Such a vehicle body transfer machine is generally constructed of a vehicle body assembly line which includes a plurality of work stages located in a spaced relationship with a given interval, with a final stage and an initial stage being connected to one another with a return line to form a circulated line to enable a transfer truck, which supports the vehicle body, to be circulated in use. In such a structure, the transfer truck is constructed of a plurality of multi-axis units each with an operating freedom in orthogonal three axes, with each multi-axis unit carrying at its distal end a locating pin whose three-dimensional position can be substantially changed over to an arbitrary selected position. The circulated line is constructed of a change-over stage mounted with a change-over robot. With such a structure, when transferring the vehicle bodies of another vehicle's model using the transfer truck, the change-over unit operates to release the coupling force (restricting force) of brake units adapted to restrict the operating freedoms of respective multi-axis units and subsequently to allow the change-over robot in the change-over stage to shift the locating pin of each multi-axis unit to an arbitrary position to be positioned while retaining the locating pin. Then, the operating freedom of each multi-axis unit is restricted again, completing the change-over operation of the work position of each locating pin.

SUMMARY OF THE INVENTION

More specifically, in such a structure of the vehicle transfer machine, each multi-axis unit includes air cylinders contained therein for restoring original positions of respective operating freedoms in the orthogonal three axes. With such an arrangement, when releasing the coupling force (the restricting force) of each brake unit by supplying compressed air thereto from outside during the change-over operation of the locating pin, simultaneously, the three air cylinders are operated to cause the locating pin to move to original positions correlated with respective directions to be restored at the original point at once. Thus, it is required for the vehicle body transfer machine to undesirably employ the air cylinders specific for respective operating freedoms to restore the original point. This results in an increase in the number of component parts, with a resultant complicated structure and large size in structure.

Further, when changing over the position of the locating pin, since an annular recessed portion formed near the locating pin is gripped with the robot's hand and is moved in the respective positions at a stretch using the operating freedom in the orthogonal three axes in the X-, Y- and Z-directions, there is a difference in distance between the annular recessed portion, which the force of the robot is applied, and a relevant slide portion for each operating freedom. This causes a difference in momentum due to resistance of the slide portion such that the robot's hand encounters a difficulty in a smooth movement in either direction of the operating freedom with a resultant extremely degraded positioning precision in such a direction of the operating freedom.

Also, the hand of the change-over robot has no function to correct a relative positioning error caused during gripping operation of the hand and no function to detect that the annular recessed portion has been gripped. Consequently, even with the presence of displacement in position for some reasons such that the hand is unable to grip the annular recessed portion by any possibility, the change-over robot tends to carry out the regular operation, with a degraded reliability in operation of the vehicle body transfer machine.

The present invention has been made with the above view and has an object to provide a vehicle body transfer machine and a method thereof which is able to change over a three-dimensional position of a locating pin in a smooth and reliable manner without the need for actuators such as air cylinders correlated in three axes of an operating freedom of the locating pin.

According to one aspect of the present invention, there is provided a vehicle body transfer machine transferring a vehicle body along a transfer path by using a transfer truck with which the vehicle body is supported, the transfer truck being returned to an initial starting position of the transfer path for a repeated use when transfer of the vehicle body is terminated. The vehicle body transfer machine is provided with: a jig change-over stage located before the initial starting position of the transfer path; a plurality of locator jigs respectively mounted on the transfer truck in spaced relationship to each other, each of the plurality of locator jigs including an upwardly directed locating pin to position the vehicle body and having operating freedoms in orthogonal three axes involving horizontal two directions of X- and Y-directions and a vertical direction of a Z-direction to respectively alter a three-dimensional position of the locating pin, and a plurality of lock units being attached to each of the plurality of locator jigs to restrict the operating freedoms thereof so as to lock the locating pin at the three-dimensional position; an unlock-operating unit connected to the jig change-over stage to unlock-operate the plurality of lock units when the transfer truck is positioned in the jig change-over stage; and a jig change-over unit mounted on the jig change-over stage, the jig change-over unit being associated with corresponding one of the plurality of locator jigs to allow the operating freedoms thereof to be utilized for changing over the three-dimensional position of the locating pin of the corresponding one of the plurality of locator jigs to an arbitral three-dimensional position, while the unlock-operating unit being actuated to unlock-operate the plurality of lock units of the corresponding one of the plurality of locator jigs. The jig change-over unit includes a socket portion engageable with the locating pin of the corresponding one of the plurality of locator jigs, the socket portion being moveable toward the locating pin to be brought into engagement therewith under a first unlock condition established when the unlock-operating unit unlock-operates the plurality of lock units, which is correlated with the horizontal two directions, of the corresponding one of the plurality of locator jigs to perform a relative positioning in the two horizontal directions between the jig change-over unit and the corresponding one of the plurality of locator jigs.

In other words, there is provided a vehicle body transfer machine transferring a vehicle body along a transfer path by using a transfer truck with which the vehicle body is supported, the transfer truck being returned to an initial starting position of the transfer path for a repeated use when transfer of the vehicle body is terminated. The vehicle body transfer machine is provided with: a jig change-over stage located before the initial starting position of the transfer path; a plurality of locator jigs respectively mounted on the transfer truck in spaced relationship to each other, each of the plurality of locator jigs including an upwardly directed locating pin to position the vehicle body and having operating freedoms in orthogonal three axes involving horizontal two directions of X- and Y-directions and a vertical direction of a Z-direction to respectively alter a three-dimensional position of the locating pin, and a plurality of lock units being attached to each of the plurality of locator jigs to restrict the operating freedoms thereof so as to lock the locating pin at the three-dimensional position; unlock-operating means for unlock-operating the plurality of lock units when the transfer truck is positioned in the jig change-over stage; and jig change-over means for changing over the three-dimensional position of the locating pin of corresponding one of the plurality of locator jigs to an arbitral three-dimensional position, while the unlock-operating means being actuated to unlock-operate the plurality of lock units of the corresponding one of the plurality of locator jigs. The jig change-over means includes socket means for engaging with the locating pin of the corresponding one of the plurality of locator jigs, the socket means being moveable toward the locating pin to be brought into engagement therewith under a unlock condition established when the unlock-operating means unlock-operates the plurality of lock units, which is correlated with the horizontal two directions, of the corresponding one of the plurality of locator jigs to perform a relative positioning in the two horizontal directions between the jig change-over means and the corresponding one of the plurality of locator jigs.

Besides, there is provided a method transferring a vehicle body along a transfer path by using a transfer truck with which the vehicle body is supported, the transfer truck being returned to an initial starting position of the transfer path for a repeated use when transfer of the vehicle body is terminated. The method provides a jig change-over stage located before the initial starting position of the transfer path; provides a plurality of locator jigs respectively mounted on the transfer truck in spaced relationship to each other, each of the plurality of locator jigs including an upwardly directed locating pin to position the vehicle body and having operating freedoms in orthogonal three axes involving horizontal two directions of X- and Y-directions and a vertical direction of a Z-direction to respectively alter a three-dimensional position of the locating pin, and a plurality of lock units being attached to each of the plurality of locator jigs to restrict the operating freedoms thereof so as to lock the locating pin at the three-dimensional position; provides a jig change-over unit mounted on the jig change-over stage, the jig change-over unit being associated with corresponding one of the plurality of locator jigs to allow the operating freedoms thereof to be utilized for changing over the three-dimensional position of the locating pin of the corresponding one of the plurality of locator jigs; positions the transfer truck in the jig change-over stage; unlock-operates the plurality of lock units of each of the plurality of locator jigs when the transfer truck is positioned in the jig change-over stage; and changes over the three-dimensional position of the locating pin of each of the plurality of locator jigs to an arbitral three-dimensional position by using the jig change-over unit, while unlock-operating the plurality of lock units of each of the plurality of locator jigs. The jig change-over unit is moved toward the locating pin of the corresponding one of the plurality of locator jigs to be brought into engagement therewith under a unlock condition, which is established by unlock-operating the plurality of lock units, which is correlated with the horizontal two directions, of the corresponding one of the plurality of locator jigs to perform a relative positioning in the two horizontal directions between the of jig change-over unit and the corresponding one of the plurality of locator jigs.

Other and further features, advantages, and benefits of the present invention will become more apparent from the following description taken in conjunction with the following drawings.

DETAILED DESCRIPTION OF THE PREFERRED EMBODIMENTS

To describe the present invention more in detail, a vehicle body transfer machine of an embodiment of the present invention to carry out a method of the present invention will be explained below with reference to the accompanied drawings.

Figure 1:
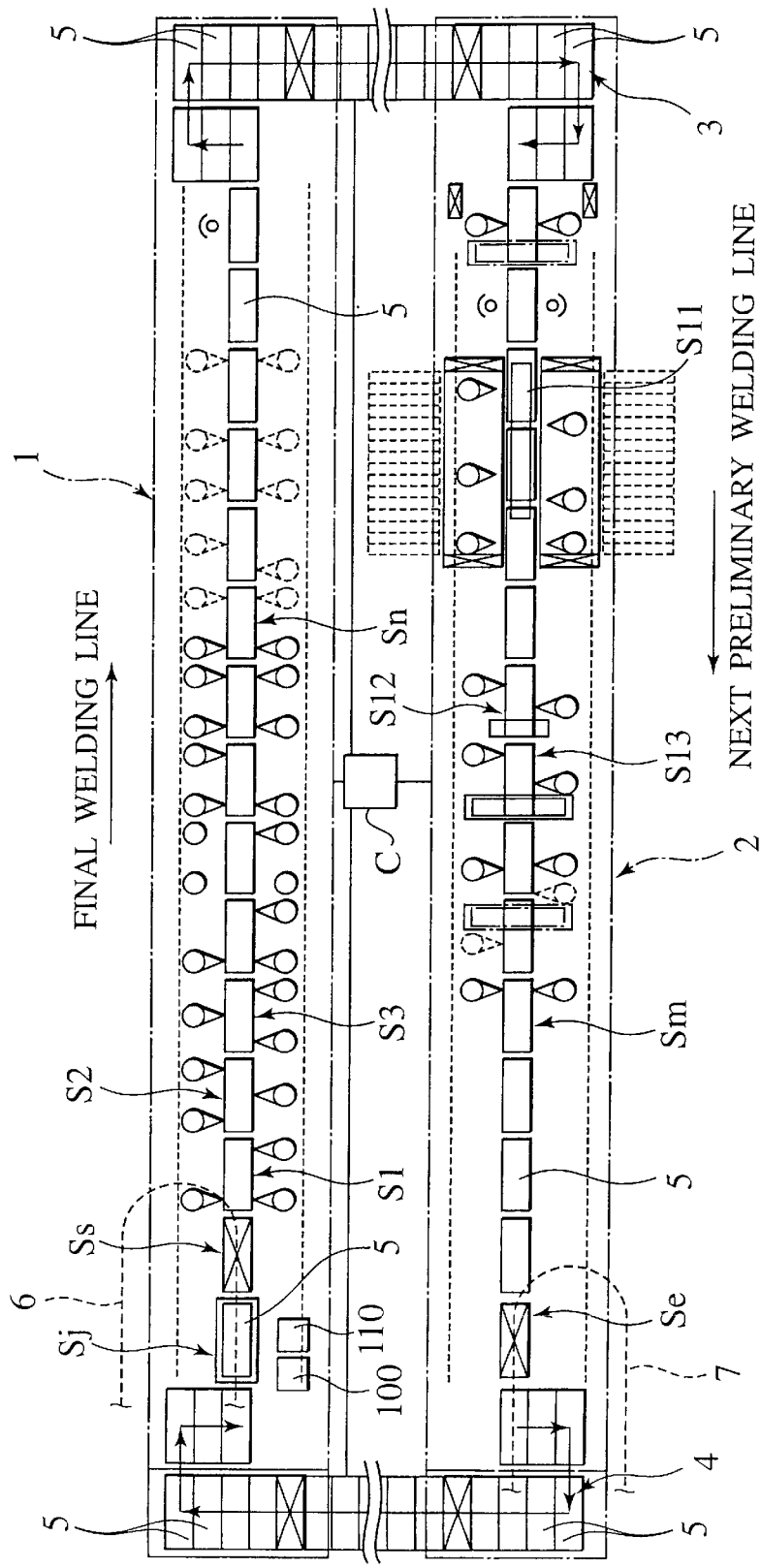
FIG. 1 is a schematic plan view illustrating a vehicle body assembly line to which a vehicle body transfer machine of an embodiment according to the present embodiment is applied.

Referring to FIG. 1, there is shown a vehicle body assembly line, for vehicles such as automobiles, controlled by a controller C and arranged in a so-called mixed flow production system to which the vehicle body transfer machine of the present embodiment is applied. In FIG. 1, the vehicle body assembly line is constructed of a final welding line 1, which is for a so-called floor main of a vehicle body, including a plurality of welding stages S1, S2, S3 . . . Sn mainly composed of respective welding robots, a next preliminary welding line 2, which is for a so-called body main of a vehicle body, including a plurality of welding stages S11, S12, S13 . . . Sn mainly composed of respective welding robots, and left and right storage lines 3, 4 located at distal ends of the final welding line 1 and the preliminary welding line 2 to form a closed loop structure. A plurality of transfer trucks 5 are to be sequentially disposed in the final welding line 1, the preliminary welding line 2, and the left and right storage lines 3, 4 to move in a sequential transfer motion by means of transfer units, which are not shown, while carrying the body panel through the final welding line 1, the storage line 3 and the preliminary welding line 2 for thereby increasing a completion quality of a vehicle body.

Here, the final welding line 1 serves to carry out the final spot welding step at a large number of welding points on the body panel such as the floor main typically composed of an engine compartment, a front floor panel and a rear floor panel which have been preliminarily welded in its preliminary welding step, which is not shown, as to the floor main. Likewise, the next preliminary welding line 2 refers to a step for preliminary assembling a body panel such as the body main composed of left and right body sides, a roof panel and the pre-assembled floor main subsequent to the final welding step and for performing spot welding steps of these components to preliminary fix them to one another, that is, for preliminarily welding the body panel such as the body main.

More specifically, after the transfer truck 5 is positioned at a panel supply stage Ss which serves as a starting distal section of the final welding line 1, an overhead conveyor 6 transfers the preliminarily welded floor main, which is then to be supplied to the transfer truck 5, by means of a drop lifter which is not shown, and the floor main is positioned on the transfer truck 5. Then, the transfer truck 5 is moved along respective stages S1, S2, S3 . . . Sn of the final welding line 1 to perform spot welding steps (final welding step) in a sequential manner. Upon termination of such spot welding steps, the transfer truck 5, which carries the floor main, is transferred from the final welding line 1 to the storage line 3.

In the storage line 3, the transfer truck 5 with the floor main is stored in a transversely storage manner and are soon transferred to the preliminary welding line 2 in a direction opposite to that in which the transfer truck 5 travels through the final welding line 1. Then, during a course of traveling of the transfer truck 5 through the respective stages S11, S12, S13 . . . Sm of the preliminary welding line 2, the spot welding steps (preliminary welding step) are carried out for the body panel including the floor main and the left and right body sides or the like placed on the transfer truck 5, sequentially. When the transfer truck 5, which is loaded with the body main preliminarily welded by the completed preliminary welding step, is positioned at a panel carrying-out stage Se at a terminal section of the preliminary welding line 2, a drop lifter, which is not sown, is allowed to lift up only the preliminarily welded body panel, that is, the body main which is then to be transferred to its next final welding step, which is not shown, by an overhead conveyor 7.

On the other hand, upon carrying out the vehicle body, an unloaded transfer truck 5 is transferred to the storage line 4 and kept in the transverse storage sate in a manner as previously described with reference to the storage line 3 such that the transfer truck 5 is soon returned to the initial starting section of the final welding line 1 for reuse.

Here, the transfer truck 5 has a plurality of upright locator jigs with locating pins for supporting the body panel in a positioned relationship. The respective locator jigs are arranged to fully conform to the mixed flow manufacturing mode, that is, a three-dimensional position of each locating pins is enabled to be arbitrarily changed over or altered in order to have the respective locator jigs coped with the proper positioning and supporting of the body panels of a plurality of vehicle's models. Further, until the transfer truck 5 is transferred from the storage line 4 to the final welding line 1 to allow the body panel to be supplied at the panel supply stage Ss, respective positions of the locating pins must be preliminarily changed over to respective desired positions to achieve proper positioning and supporting of the body panel of another vehicle's model. To this end, a jig change-over stage Sj is preset at a preceding stage of the panel supply stage Ss. Incidentally, the jig change-over stage Sj is described below in detail.

Figure 2:
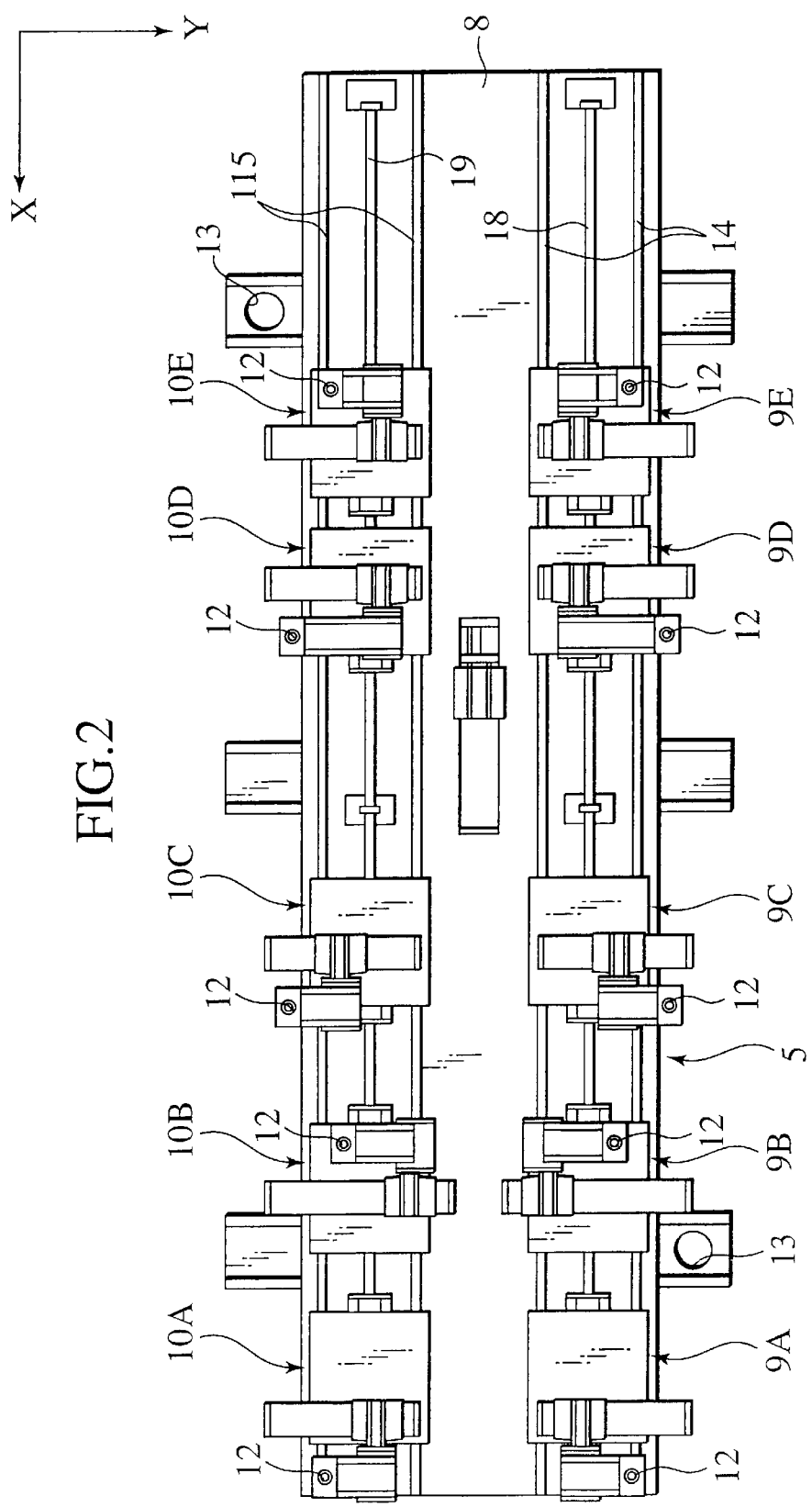
FIG. 2 is a plan view of a transfer truck to be used by the vehicle body transfer machine shown in FIG. 1.
Figure 3:
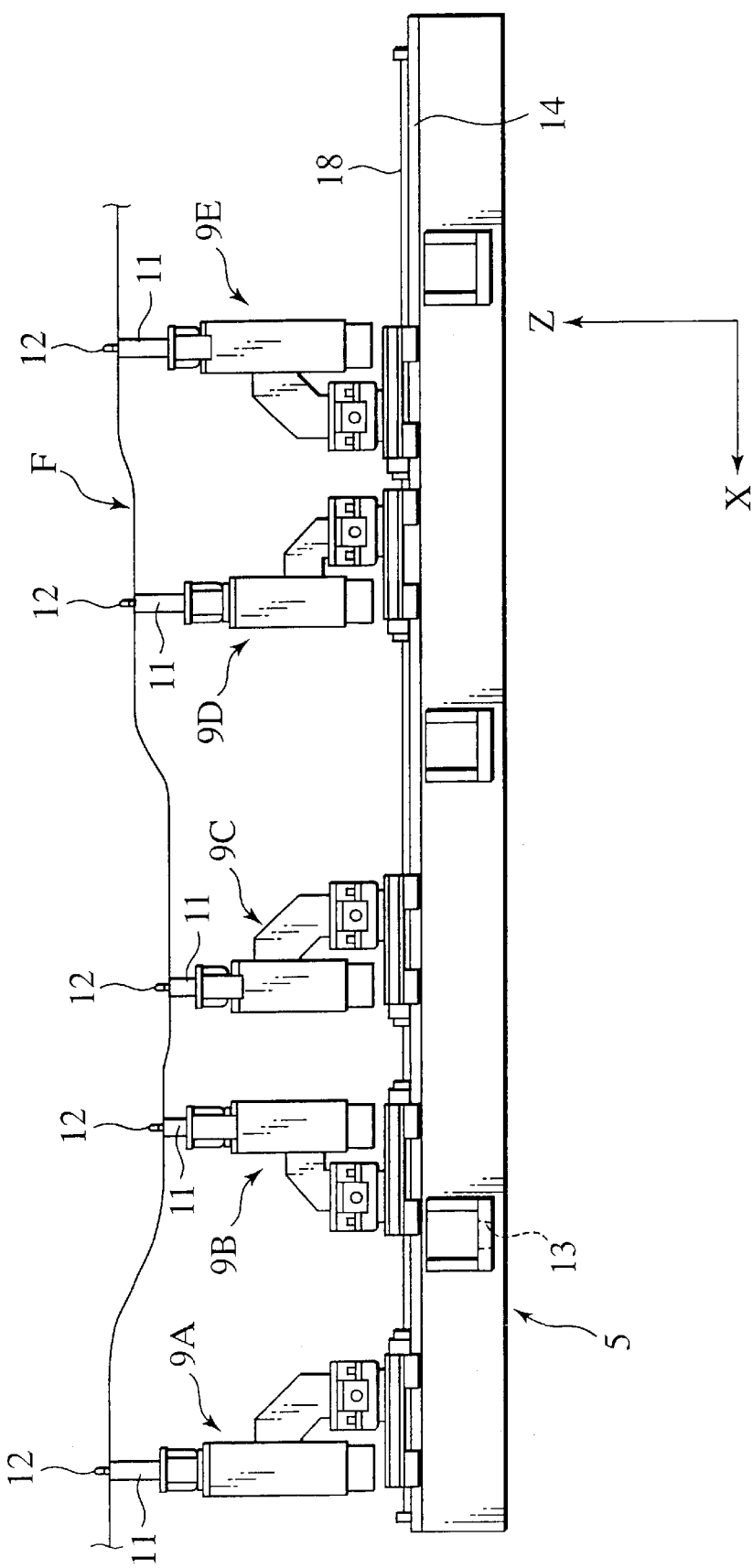
FIG. 3 is a side view of the transfer truck shown in FIG. 2.

FIG. 2 is a plan view illustrating a detailed structure of the aforementioned transfer truck 5, and FIG. 3 is a front view illustrating the same. As viewed in FIGS. 2 and 3, the transfer truck 5 includes a major part constructed of a base 8, and also first and second rows, which are laterally spaced from one another, of locator jigs 9A to 9E and 10A to 10E which are longitudinally located to stand upright on the base 8 in a spaced relationship. Each of the locator jigs 9A to 9E and 10A to 10E is constructed of a major locator machine in the form of a manipulator or a robot with an operating freedom in orthogonal (perpendicular) three axes wherein a X-axis unit 16, a Y-axis unit 24 and a Z-axis unit 30 of slide unit types are disposed without respective actuators and are so arranged as to allow the Z-axis unit to lie at the uppermost side. The major locator machine includes a locating unit 11 mounted at an upper distal end of the Z-axis unit 30 and composed of a locating pin 12 standing upright in a manner described below in detail. Further, each of the locator jigs 9A to 9E and 10A to 10E includes brake units serving as lock units, respectively, associated with orthogonal three axes of the operating freedom in a manner as will be described below in detail and has a function to allow the three orthogonal axes on the operating freedom to be restricted to cause the three-dimensional position of the aforementioned locating pin 12 to be firmly retained by itself. In addition, each locator jig also has a function to independently release the restricting force applied to each brake unit such that when the locating pin 12 responds to an external force exerted by the other unit, the three-dimensional position of the locating pin 12 is arbitrarily altered with the operating freedom in the orthogonal three-axes. Incidentally, in FIG. 3, a numeral F designates the floor main positioned by each locating pin 12.

Also, both distal ends of the base 8 are formed with positioning holes 13, 13 which are diagonally located at two points to provide positioning reference areas for carrying out the positioning of the transfer truck 5 at each stage with the jig change-over stage Sj.

Figure 4:
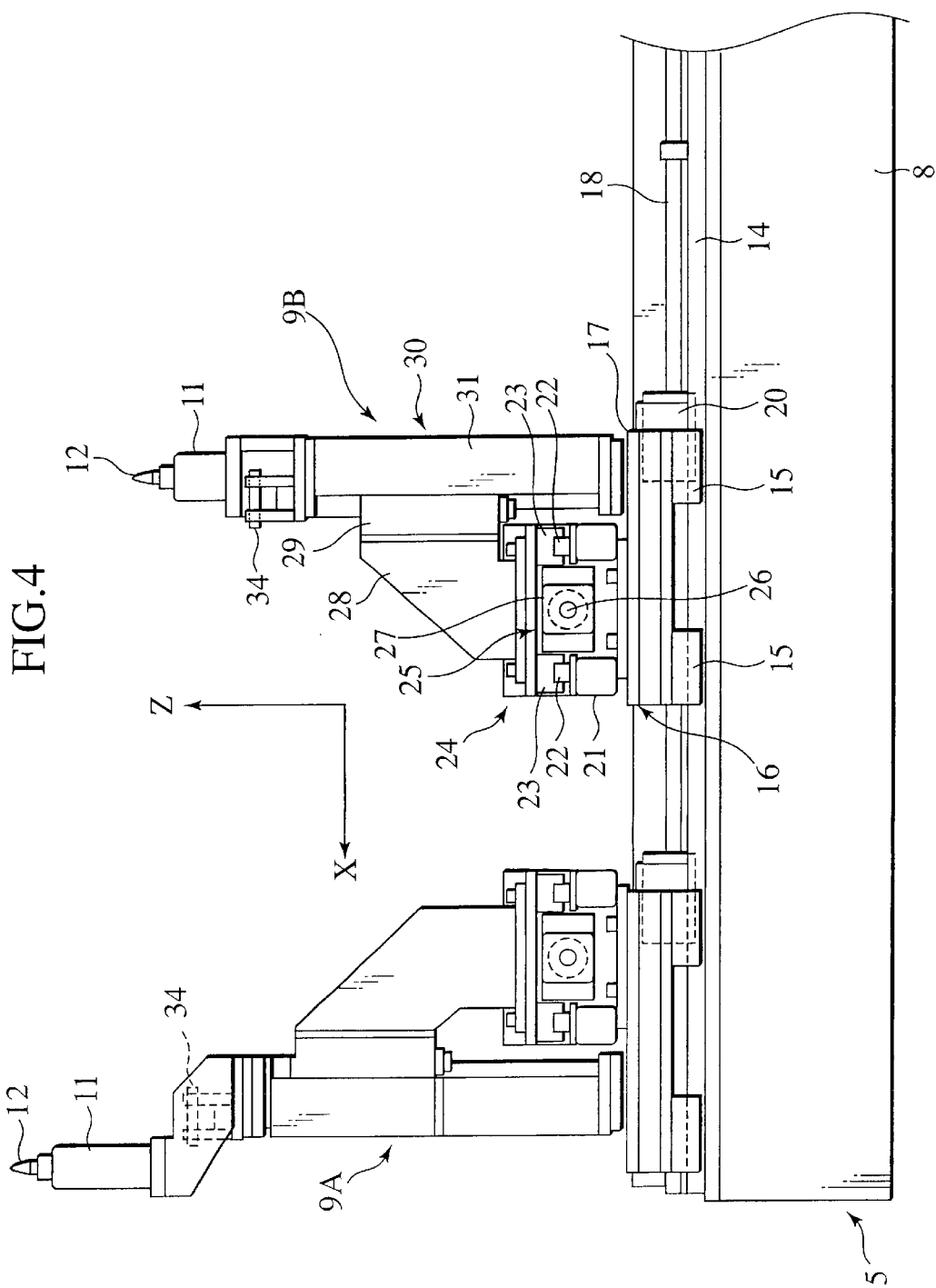
FIG. 4 is an enlarged side view of the transfer truck shown in FIG. 3.
Figure 5:
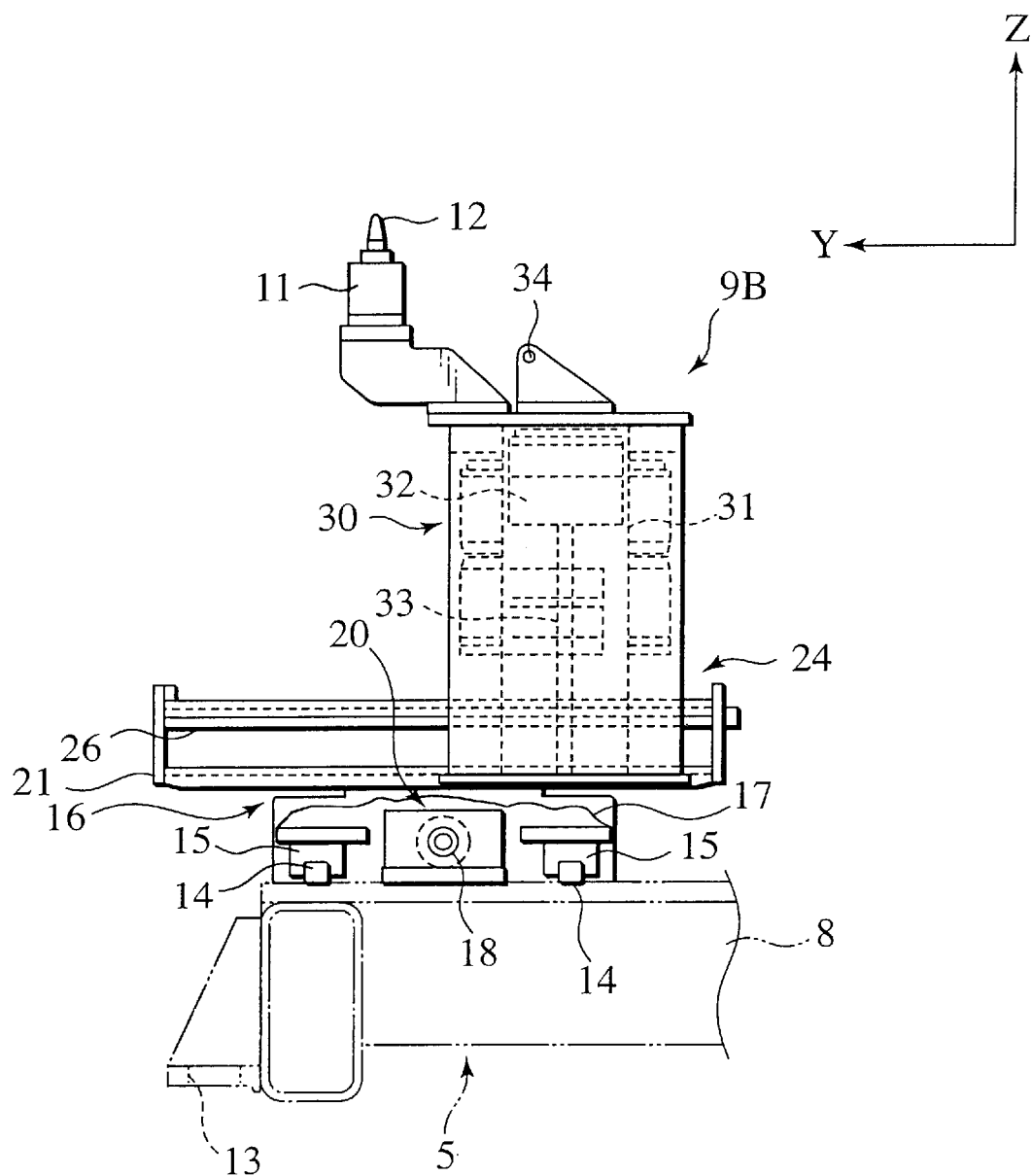
FIG. 5 is a right side view, which is along an X-direction, of the transfer truck shown in FIG. 4.
Figure 6:
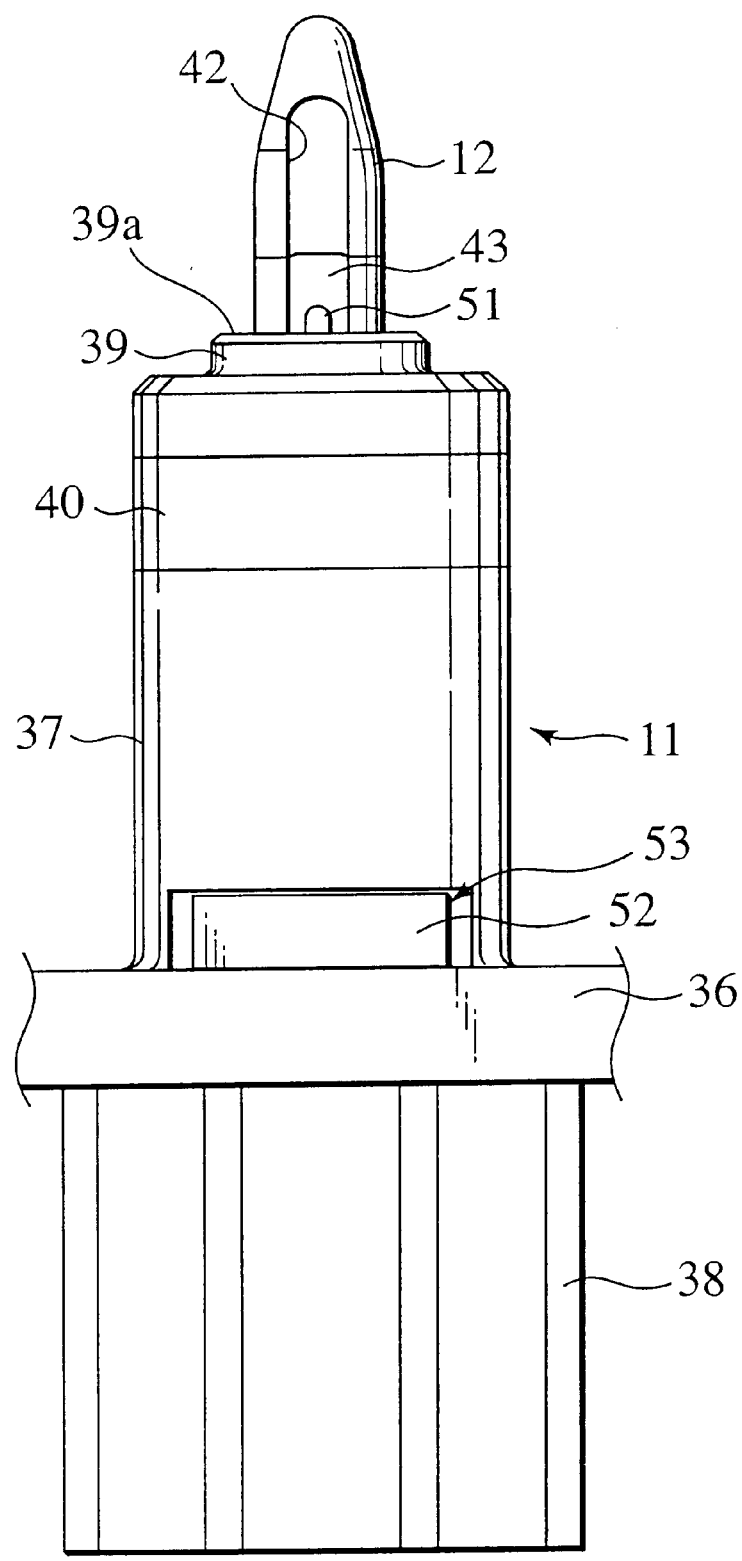
FIG. 6 is an enlarged view of a locating unit including a locating pin shown in FIGS. 4 and 5.

Among the plurality of locator jigs 9A to 9E and 10A to 10E, a typical example of a detailed structure of the locator jig 9B is exemplarily described with reference to FIGS. 4 and 5, wherein FIG. 4 is an enlarged view of a major part of the structure shown in FIG. 3, and FIG. 5 is a right side view of the structure shown in FIG. 4.

As viewed in FIGS. 2 to 5, a pair of laterally spaced, X-axis guide rails 14, 14 are located on the base 8 for its entire length in a correlated relationship with the respective rows of the plurality of locator jigs 9A to 9E, and X-axis guide rails 115, 115 are similarly located with the respective rows of the plurality of locator jigs 10A to 10E. 10A to 10E. In each locator jig, an X-axis slider 17, which forms a major body of the X-axis unit 16, is located on the X-axis guide rails 14, 14 or the X-axis guide rails 115, 115 through a linear guide pair 15, 15 for sliding movement in a horizontal and an X-direction. A pair of laterally spaced brake shafts 18, 19 are located on the base 8 for its entire length in parallel relationship and are correlated with the respective rows of pluralities of locator jigs 9A to 9E and 10A to 10E, with a brake unit 20 being fixedly secured to an end of the X-axis slider 17, which serves as a lock unit, and slidably coupled to corresponding one of the brake shafts 18 and 19. The brake unit 20 mechanically locks the X-axis slider 17 at a given fixed position with a braking force to clamp and restrict its corresponding brake shaft 18 or brake shaft 19 by the action of a resilient member such as a coil spring and is operative to receive compressed air to instantaneously release the aforementioned braking force to provide the freedom of sliding movement to the X-axis slider 17.

As best seen in FIGS. 4 and 5 in which the locator jig 9B is exemplarily described, a Y-axis base 21 is fixedly supported on the X-axis slider 17, and a pair of Y-axis guide rails 22, 22 are fixedly supported on the Y-axis base 21 to lie perpendicular to the X-axis guide rail 14. A Y-axis slider 25, which forms a major body of the Y-axis unit 24, is mounted to the Y-axis guide rails 22 through a linear guide pair 23 for sliding movement in a horizontal and a Y-direction. A brake shaft 26 is fixedly secured to the Y-axis base 21 for its entire length and extends in the Y-direction, with a brake unit 27 being coupled to the brake shaft 26 for sliding movement and fixedly secured to an end of the Y-axis slider 25 to serve as a lock unit thereof. The brake unit 27 is constructed in the entirely same structure as that of the X-axis unit 16 and mechanically locks the Y-axis slider 25 at a given fixed position with a braking force to clamp and restrict the brake shaft 26 by the action of a resilient member such as a coil spring while the brake unit 27 is operative to receive compressed air to instantaneously release the aforementioned braking force for thereby providing the freedom of sliding movement to the Y-axis slider 25.

A Z-axis base 29 is fixedly supported on the aforementioned Y-axis slider 25 through a bracket 28. A Z-axis slider 31, which forms a major body of the Z-axis unit 30, is similarly mounted to the Z-axis base 29 through Z-axis guide rails and a linear guide pair for sliding movement in a vertical, i.e. a Z-direction. A brake shaft 33 is fixedly secured to the Z-axis base 29 for its entire length and extends in the Z-direction, with a brake unit 32 being connected to the brake shaft 33 for sliding movement and fixedly secured to the Z-axis slider 31 to serve as a lock unit thereof. The brake unit 32 is constructed in the entirely same structure as those of the X-axis unit 16 and the Y-axis unit 24 and mechanically locks the Z-axis slider 31 at a given height position with a braking force to clamp and restrict the brake shaft 33 while the brake unit 32 is operative to receive compressed air t to instantaneously release the aforementioned braking force for thereby providing the freedom of sliding movement to the Z-axis slider 31 in the vertical direction. An upper end of the Z-axis slider 31 is mounted with an upright locating unit 11, which is mainly composed of the locating pin 12 with a clamping function in a manner as will be described below in detail, and a horizontally extending hook pin 34 (see FIGS. 11 and 12) in a close proximity relationship. Also, the hook pin 34 is supported at its both ends with a pair of brackets 35 as seen in FIG. 12.

As clearly understood from the foregoing description, when a drive force is applied from outside, the locator jig 9B has a function to arbitrarily enable the three-dimensional position of the location pin 12 to be altered in response to an associated movement of the X-axis unit 16, the Y-axis unit 24 and the Z-axis unit 30. Incidentally, the locator jig 9B, which includes such a locating unit 11, basically has the same structure as those of the other locator jigs 9A, 9C to 9E and 10A to 10E.

FIGS. 6 to 9 show a detailed structure of the locating unit 11 to be mounted to the distal end of each of the aforementioned locators 9A to 9E and 10A to 10E. The locating unit 11 is constructed of a hollow, cylindrical post section 37 with a mounting flange 36, and a clamp cylinder 38, composed of an air cylinder or a hydraulic cylinder type formed in a substantially rectangular column shape, which is fixedly coupled to the post section 37 through the mounting flange 36 thereof in a concentric relationship. The locating pin 12, which has a tapered shape having its base portion formed with a seating flange 39, is fixedly supported with an upper distal end of the post section 37 through a spacer 40 by means of a plurality of fixture bolts 41.

The clamp cylinder 38 includes a piston rod 45 and a clamp arm 43 associated with the same, which are held in a retracted state, i.e. a clamped condition, with the action of a compression spring (not shown) contained in the clamp cylinder 38 and which is operable only in response to compressed air or pressurized hydraulic pressure supplied from the outside to lift the piston rod 45 to render the clamp cylinder 38 be brought into an unclamped condition.

Figure 9:
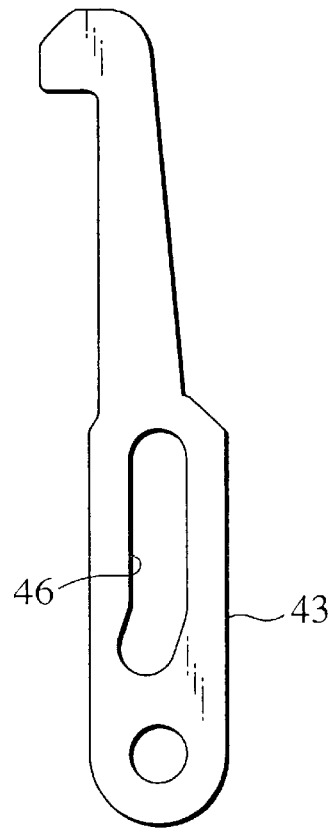
FIG. 9 is an enlarged view of a clamp arm of the locating unit shown in FIG. 7.

The locating pin 12 is partly formed with a vertically extending slit-shaped recess 42 in communication with an internal space of the post section 37 to allow the clamp arm 43 formed in a substantially key-shape as seen in FIG. 9, which serves as a clamping unit, to be inserted for a locking and unlocking movement. In particular, an upper distal end of the key-shape of the clamp arm 43 is exposed to the outside of an opening portion 44 formed at the base portion of the locating pin 12, with a lower distal end of the clamp arm 43 being coupled to the piston rod 45 of the clamp cylinder 38. The clamp arm 43 is formed at its intermediate portion with an angled grooved cam 46 with which a fixed pin 47, laterally extending in a radial direction of the post section 37, engages. With such a structure, upon extending or retracting movements of the clamp cylinder 38, the clamp arm 43 is brought into an clamping operation or an unclamped operation between a clamping position C1 and an unclamped position C2. Especially under the clamped condition shown in FIG. 7, a lower panel W3, which is a part of a given panel such as the floor main F, is clamped in a pinched state with the distal end of the clamp arm 43 and the seating flange 39.

Figure 7:
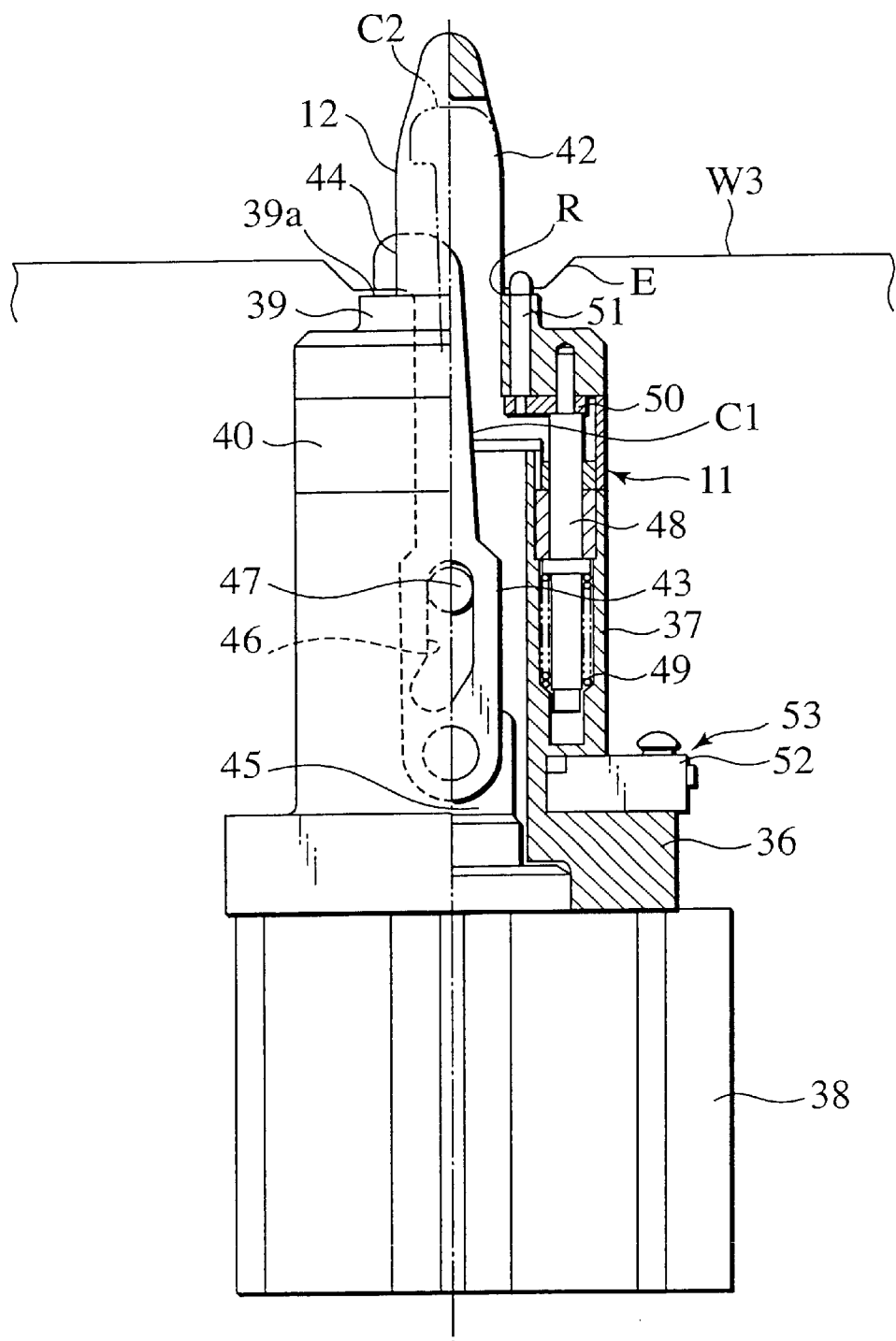
FIG. 7 is a vertical cross sectional view of the locating unit shown in FIG. 6.
Figure 8:
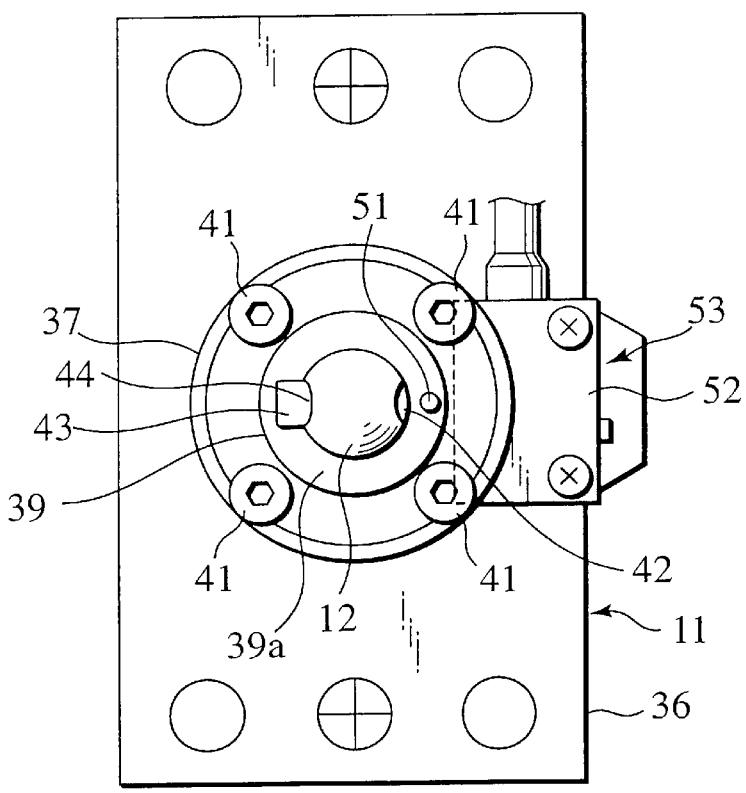
FIG. 8 is a plan view of the locating unit shown in FIG. 7.

As viewed in FIG. 7, the panel W3 of the floor main F has a downwardly protruding embossed portion E formed with a location bore R, with the locating pin 12 mating with the location bore R to allow a circumferential periphery of the location bore R to be seated on the seating flange 39 of the locating pin 12 for thereby finally finishing the positioning step of the locating pin 12.

Inside the post section 37 of the locating unit 11, a shaft 48 of a stepped diametrical shape is located for sliding movement in parallel to an axis of the locating pin 12 and is urged upward as seen in FIG. 7 by a compressed coil spring 49. A coupling plate 50 is connected to a small diameter end portion of the shaft 48 and has an end portion, which is offset from the shaft 48, fitted with a lower distal end of a detection pin 51, standing upright in parallel to the shaft 48, which protrudes from or retracts from a work-piece seating surface 39a of the seating flange 39 of the locating pin 12. With such a structure, an upper distal end of the detection pin 51 remains protruded from the seating flange 39 in the absence of the panel W3 on the seating flange 39. However, in the presence of the given panel W3 seated on the seating flange 39, the distal end of the detection pin 51 is retracted within the seating flange 39 to cause the shaft 48 to move downward.

Further, a proximity switch 52 is located on the post section 37 at a position opposed to a lower distal end of a large diameter section of the shaft 48 such that when the detection pin 51 protrudes from the seating flange 39 as viewed in FIG. 7 to cause the lower distal end of the shaft 48 is separated from the proximity switch 52 which remains OFF state. Upon retracting movement of the detection pin 51 into the seating flange 39 as described above, the proximity switch 52 is turned on to ON state by sensing the proximity approach of the shaft 48 due to its downward sliding movement.

Thus, a work-piece seating detection mechanism 53 serving as a work-piece seating detection means is constructed of the shaft 48, the detection pin 51 and the proximity switch 52 to detect the presence of or the absence of the panel W3 with respect to the seating flange 39. With this arrangement, sliding displacements of the detection pin 51 and the shaft 48 following the seating phase of the panel W3 on the seating flange 39 cause the presence or the absence of the panel W3 to be detected with the proximity switch 52 for turning ON or OFF. Incidentally, in such a work-piece seating detecting mechanism, a photoelectric sensor may be applied to detect the presence of the panel W3, and compressed air may be used to urge the locating pin 12. Also, a work-piece seating detection mechanism of a non-contact type may be alternatively employed.

Figure 10:
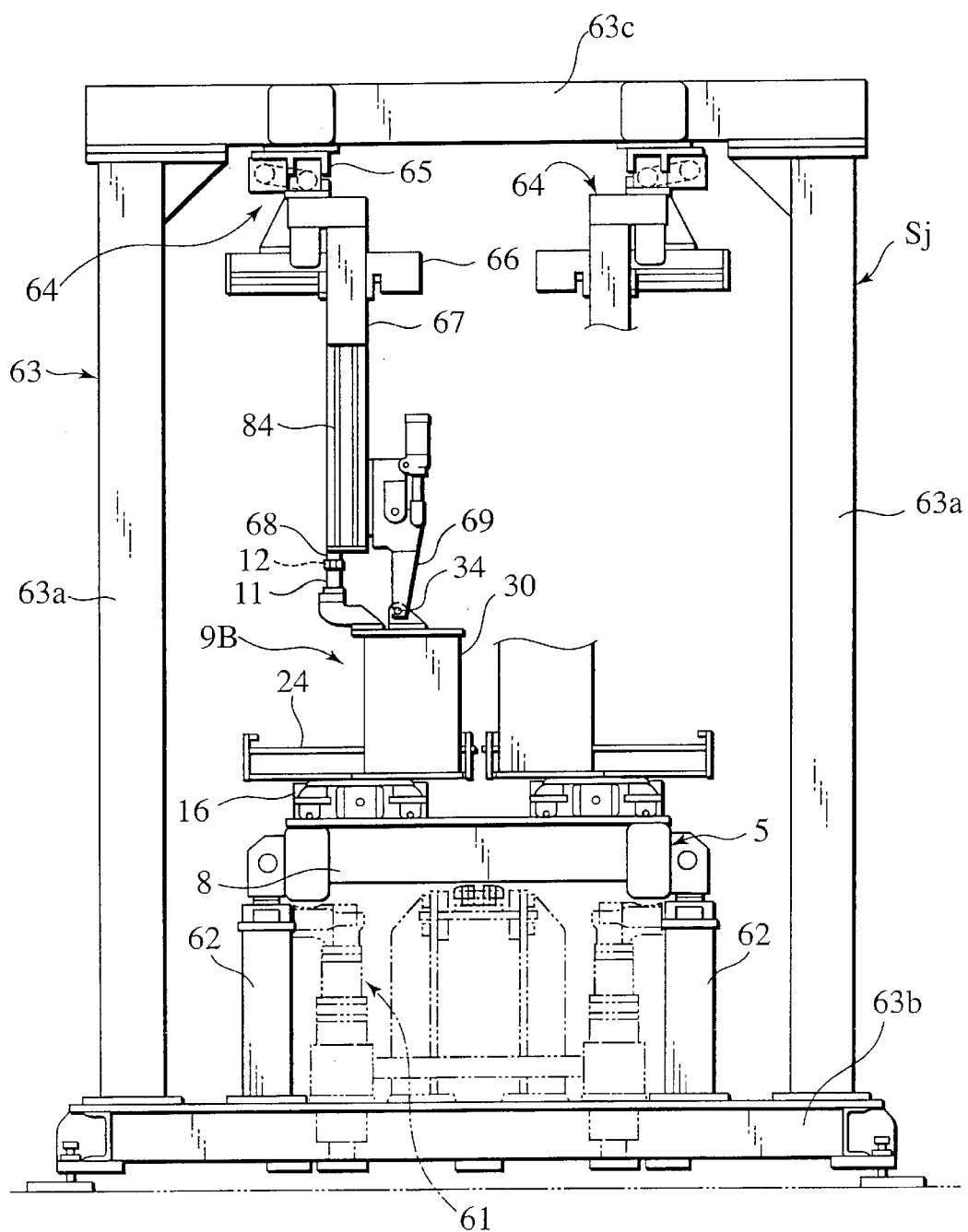
FIG. 10 is an enlarged view mainly illustrating a jig change-over stage of the vehicle body transfer machine shown in FIG. 1.

FIG. 10 shows a detailed structure of the jig change-over stage Sj shown in FIG. 1. The jig change-over stage Sj has a laterally space, upright standing posts 62, to which the transfer truck 5 is transferred with a transfer unit 61 of a plane shuttle type and is positioned in a horizontal condition with a reference to the positioning bores 13, 13 (see FIG. 2). The jig change-over stage Sj also includes a machine frame 63 composed of a pair of laterally spaced, vertical frame components 63a, 63a standing upright from a base frame component 63b to remain outward of the posts 62, 62, and a top frame component 63c connected to upper distal ends of the vertical frame components 63a, 63a such that the machine frame 63 stands straddling the transfer truck 5 which remains in a positioned condition. The top frame component 63c carries the same number of jig change-over units 64 as those of the locator jigs 9A to 9E and 10A to 10E mounted on the transfer truck 5 (provided that the structure shown in FIG. 10 corresponds to that shown in the right side view of FIG. 4, wile one piece of jig change-over unit 64 and associated locator jig 9B being mainly illustrated in FIG. 10). That is, the independent jig change-over units 64 are prepared for respective locator jigs 9A to 9E and 10A to 10E to enable the positions of the locating pins 12 to be changed over at the respective locating jigs 9A to 9E and 10A to 10E. Incidentally, a single jig change-over unit or some jig change-over units less than the locator jigs 9A to 9E and 10A to 10E may be prepared, provided that such a single jig change-over is sequentially applied to the locator jig or such some jig change-over units are correspondingly shared by the locator jigs.

Figure 11:
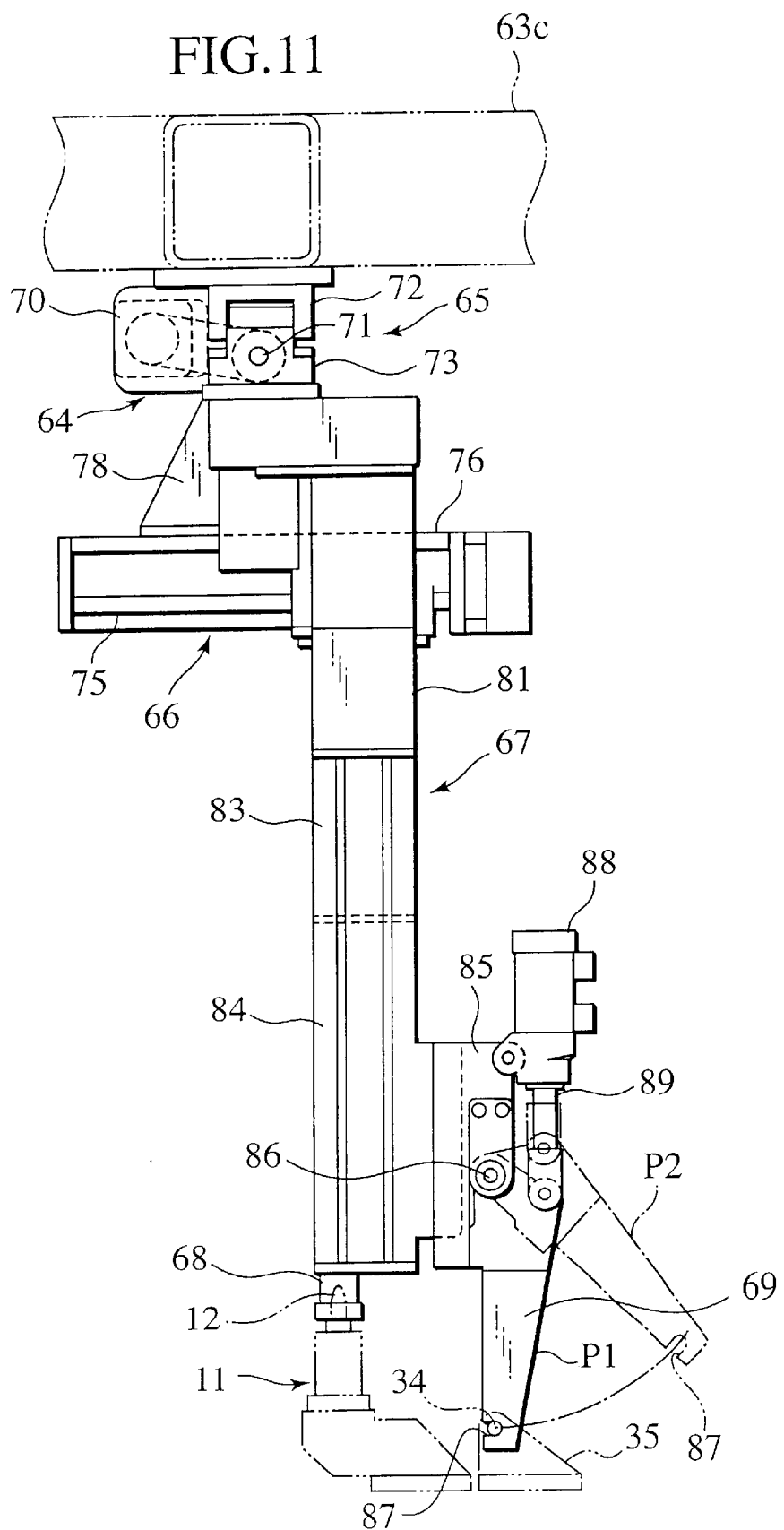
FIG. 11 is an enlarged view mainly illustrating a jig change-over unit of the vehicle body transfer machine shown in FIG. 10.
Figure 12:
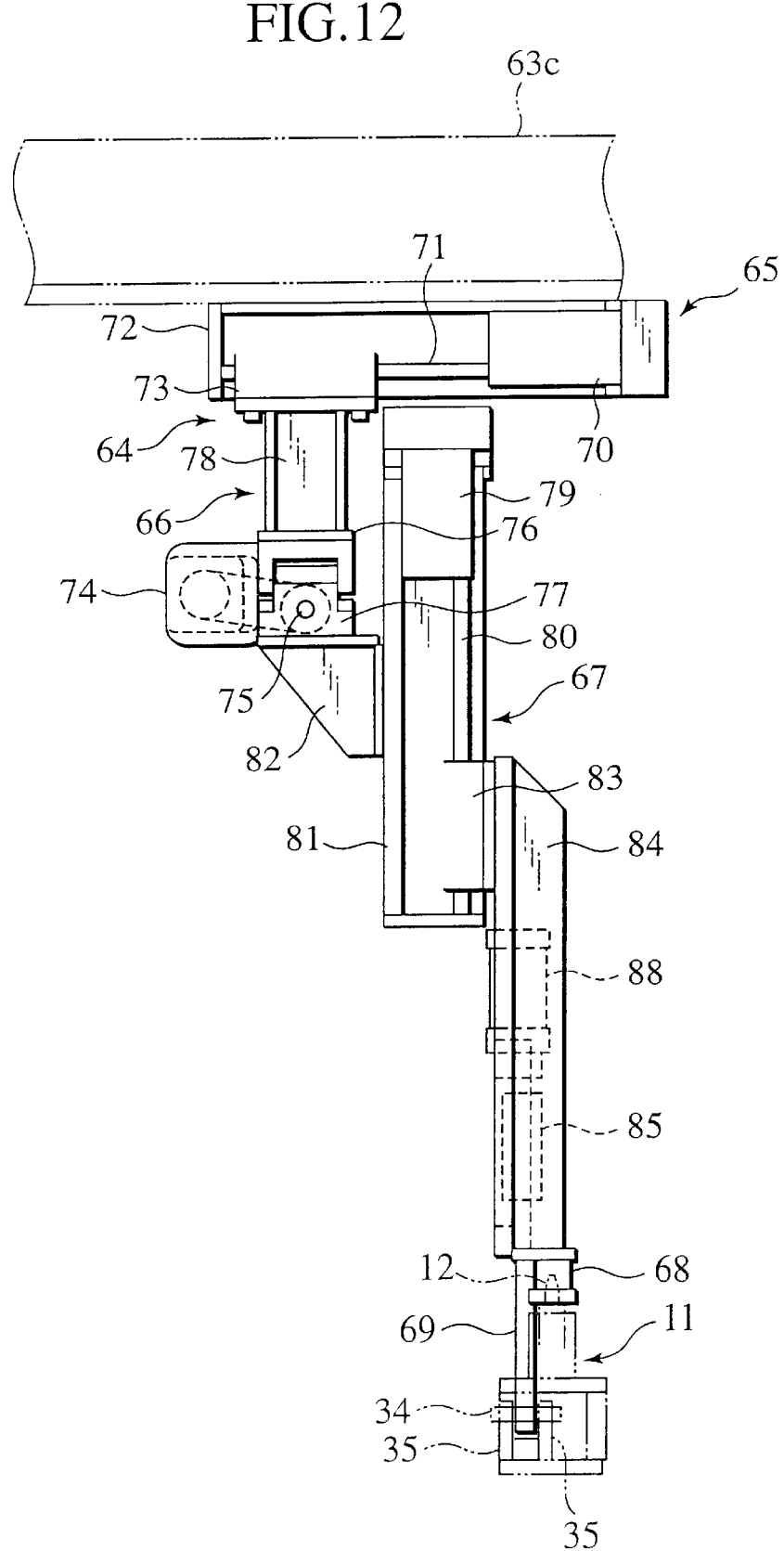
FIG. 12 is a side view of the jig change-over unit shown in FIG. 11.

As viewed in FIGS. 11 and 12, the jig change-over unit 64 is constructed of a mother machine including the X-axis unit 65, the Y-axis unit 66 and Z-axis unit 67, of respective ball-screw types driven by NC motors, which are assembled such that the Z-axis unit 67 remains in the lowest position to form a manipulator or a robot with the operating freedom in the three orthogonal axes. A distal end of the Z-axis unit 67 of the mother machine has a socket portion 68 and a swing arm 69 which serves as a coupling member, with an autonomous operation of the mother machine enabling the three dimensional positions of the socket portion 68 and the swing arm 69 to be altered to respective arbitrary positions.

In particular, the X-axis unit 65 includes a X-axis base 72, suspended from the top frame component 63c, in which a screw shaft 71 of a ball-screw type is incorporated, a X-axis drive motor 70 supported on the X-axis base 72 to drive the screw shaft 71, and a X-axis slider 73 guided by the X-axis base 72 and connected to the screw shaft 71 for sliding movement in the lateral X-direction. The Y-axis unit 66 includes a Y-axis base 76, fixedly mounted to the X-axis slider 73 by means of a flange 78, in which a screw shaft 75 of a ball-screw type is incorporated, a Y-axis drive motor 74 supported on the Y-axis base 76 to drive the screw shaft 75, and a Y-axis slider 77 guided by the Y-axis base 76 and connected to the screw shaft 75 for sliding movement in the lateral Y-direction. The Z-axis unit 67 includes a Z-axis base 81, fixedly mounted to the Y-axis slider 77 by means of a flange 82, in which a screw shaft 80 of a ball-screw type is incorporated, a Z-axis drive motor 79 supported on the Z-axis base 81 to drive the screw shaft 80, and a Z-axis slider 83 guided by the Z-axis base 81 and connected to the screw shaft 80 for sliding movement in the vertical Z-direction. An upper distal end of an extension 84 is fixedly secured to a lower end of the Z-axis slider 83, and a lower distal end of the extension 84 is mounted with the socket portion 68 and the swing arm 69 serving as the coupling member. With such a structure, the jig change-over unit 64 enables the X-axis unit 65, the Y-axis unit 66 and the Z-axis unit 67 to corporate with one another to allow the three dimensional positions of the socket portion 68 and the swing arm 69 to be arbitrarily altered.

The socket portion 68 is directly secured to a bottom end of the extension 84 by welding and has a simple cylindrical configuration to mate with the locating pin 12 of the locator jig 9B of the transfer truck 5 which remains in the positioned condition at the jig change-over stage Sj as previously noted above. The presence of a clearance between the socket portion 68 and the locating pin 12 provides an adverse affect on the positioning precision of the locating pin 12 itself and, therefore, the clearance between the socket portion 68 and the locating pin 12 in a mating stage is preset to a relatively and strictly designed value.

As best seen in FIG. 11, further, the swing arm 69, which serves as the coupling member, is supported with the extension 84 through brackets 85 and a hinge pin 86 fixedly supported with the brackets 85 for swinging movement. A lower distal end of the swing arm 69 is formed with an engagement recess 87 and an upper distal end of the swing arm 69 is connected to a piston rod 89 of an air cylinder 88 of a trunnion type which serves as a drive source. With such a structure, the swing arm 69 is enabled to move the swing arm 69 for swinging movement between a coupling position P1 and an uncoupling position P2 in response to compressing and retracting movements of the air cylinder 88. That is, the swinging movement of the swinging arm 69 from the uncoupling position P2 to the coupling position P1 allows the socket portion 60 to initially mate with the locating pin 12 at all times under a condition wherein the relative positioning is performed between the jig change-over unit 64 and the locator jig 9B. Accordingly, during swinging movement of the swing arm 69 toward the coupling position P1, the engagement recess 87 of the swing arm 69 approaches the hook pin 34 of the locator jig 9B to be brought into engagement with the hook pin 34 as viewed in FIG. 11.

Now, the operation of the vehicle body transfer machine as the above constructed will be described below in detail. Incidentally, such an operation is carried out by the controller C.

When the transfer truck 5, which has completed the transfer of the vehicle body of a particular vehicle's model type shown in FIGS. 1 and 10, is rendered to remain in the storage line 4 at once and is subsequently positioned at the jig change-over stage Sj shown in FIGS. 1 and 10 for the transfer of the vehicle body of another vehicle's model, the locator jigs 9A to 9E and 10A to 10E of the transfer truck 5 are mutually brought into opposed relationships with the respective jig change-over units 64, carrying out the change-over of the respective jigs to alter the positions of the locating pins 12 at respective positions necessary for positioning and supporting the vehicle body of another vehicle's model.

Concurrently, a pressurized supply unit 100 (see FIG. 1) and an electric power supply unit 110 (see FIG. 1), which are preliminarily prepared at the jig change-over stage Sj, are actuated to allow joint members of a plurality of connection lines for supplying pressurized air and joint members for supplying electric power to be associated with joint members mounted to the transfer truck 5. This results in supply of electric power and supply of compressed air to be performed at desired areas. Thus, it will be seen that the pressurized air unit 100 serves as an unlock-operating unit for releasing the braking forces of the brake units 20, 27, 32 mounted to the respective locator jigs 9A to 9E and 10A to 10E. Also, these movements are similarly obtained in the respective stages of the floor main final welding line 1 and the body main preliminary welding line 2 except for the jig change-over stage Sj.

When the transfer truck 5 is positioned at the jig change-over stage Sj in a manner as described above, an unlock-operating command signal is delivered from the controller C and compressed air is supplied to the brake units 20, 27, associated with the operating freedoms in the horizontal two directions, i.e. X-direction and Y-direction, among the plurality of brake units 20, 27, 32, serving as the respective locking units, which are independent for respective operating freedoms of the locator jigs 9A to 9E and 10A to 10E as seen in FIGS. 4 and 5, while quickly releasing the braking forces of the brake units 20, 27 (into an unlocked condition). When this occurs, the restricted conditions of the respective locator jigs 9A to 9E and 10A to 10E, which has the operating freedoms in the orthogonal three axes in the X-, Y- and Z-directions, are released in the horizontal X- and Y-directions such that application of external forces to the respective locating pins 12 enables the locating pins 12 to be moved in a free condition at least in the horizontal plane.

At the same time, compressed air is also supplied to the clamp cylinder 38 of the locator unit 11 shown in FIG. 7, rendering the clamp arm 43 to be retained in the unclamped condition to lift up the clamp arm 43.

Incidentally, the controller C stores information about the vehicle body of the particular vehicle's model which has been previously positioned and supported with the transfer truck 5 which is supported and positioned at the aforementioned jig change-over stage Sj, i.e. information about current three dimensional positions of the respective locating pins 12 of the locator jigs 9A to 9E and 10A to 10E. Concurrently, the controller C stores information of a vehicle body of a particular vehicle's model to be subsequently supported with the aforementioned transfer truck 5, i.e. information about the three dimensional positions of the respective locating pins 12 required for positioning and supporting the vehicle body to be subsequently processed.

Upon receipt of a command signal from the controller C, as seen in FIGS. 11 and 12, the jig change-over units 64 are activated in the autonomous operation with the operating freedom in the orthogonal three axes to cause the socket portions 68 to be moved in axial alignment with the respective locating pins 12 and then lowered to allow the socket portions 68 to be mated with relevant locating pins 12. When this takes place, even when the locating pin 12 has an error in a relative position on a plane with respect to the relevant socket portion 68, the presence of a tapered shape of the locating pin 12 allows the locating pin 12 to engage with the socket portion 68 due to its autonomous function. Thus, the position of the locating pin 12 is corrected within the plane in the X- and Y-directions of the locating pin 12 so as to follow the socket portion 68 such that both are completely aligned in positioning the horizontal plane.

Simultaneously, effectively utilizing the work-piece seating detection mechanism 53 shown in FIG. 7 enables confirmation of the presence of the socket portion 68 being seated in the proper place. If, in this instance, the socket portion 68 has seated on the seating flange 39 of the locating pin 12 in place of the panel W3 as shown in FIG. 7 and FIGS. 11 and 12, then, the work-piece seating detection mechanism 53 is actuated. In such a manner, if the locating pin 12 does not detect the seating of the socket portion 68 by any possibility, the work-piece seating detection mechanism 53 generates a given alarm to stop a subsequent processing step for a while.

Consecutively, under a condition wherein the aforementioned work-piece seating detection mechanism 53 is actuated, as seen in FIGS. 11 and 12, the swing arm 69 of the jig change-over unit 64, which is located independently of the aforementioned socket 68, is operated to cause the swing arm 69 to swing from the uncoupled position P2 toward the coupling position P1. Thus, the swing arm 69 is brought into engagement with the hook pin 34, adjacent the locating pin 12, from the lateral side such that the jig change-over units 64 are mechanically and individually coupled with the locator jigs 9A to 9E and 10A to 10E. When this occurs, since the presence of the previous engagement between the socket portion 68 and the locating pin 12 allows the jig change-over units 64 to be positioned in the horizontal plane with respect to the locator jigs 9A to 9E and 10A to 10E while the operating freedoms, in the vertical direction (Z-direction), of the locator jigs 9A to 9E and 10A to 10E remain in the restricted condition with the brake unit 32, the jig change-over units 64 and the locator jigs 9A to 9E and 10A to 10E are mechanically coupled with one another in a smooth and reliable manner.

Upon receipt of a next unlock-operating command subsequent to the mechanical coupling between the jig change-over units 64 and the locator jigs 9A to 9E and 10A to 10E, compressed air is supplied to only the brake unit 32 correlated with the operating freedom in the Z-direction (vertical direction) among the plurality of brake units 20, 27, 32, which serve as the lock unit, located independently for respective operating freedoms of the locator jigs 9A to 9E and 10A to 10E. Thus, the brake force of the brake unit 32 is immediately released (in the unlocked condition). This causes the restricted conditions in the X-axis and Y-axis as well as the vertical direction of the respective locator jigs 9A to 9E and 10A to 10E with the orthogonal three axes of operating freedoms in the X-, Y- and Z-directions to be released. When this takes place, applying an external force to the locating pin 12 and the swing arm 69 enables the locating pin 12 to be freely moved in any direction among the X-, Y- and Z-directions.

Under the above state, the locator jigs 9A to 9E and 10A to 10E are lowered to the lowest position, in the Z-direction at once with the autonomous operation of the jig change-over unit 64, at which the locating pin 12 is moved in the horizontal plane in the X- and Y-direction with the autonomous operation of the jig change-over unit 64, thereby enabling the locating pin 12 to be located at a position required for properly positioning and supporting the vehicle body of the subsequent vehicle's model. In this instance, also, the controller C delivers positioning information of the locating pin 12, necessary for initiating the positioning of the vehicle body of the subsequent vehicle's model, to the jig change-over unit 64.

In such a manner, moving the locating pin 12 at the lowest position using the orthogonal three axes in the operating freedoms of the locator jigs 9A to 9E and 10A to 10E precludes the slide portions of the locator jigs 9A to 9E and 10A to 10E having the operating freedoms in the X- and Y-direction from being applied with an excessive force to perform change-over of the position of the locating pin 12 with an extremely small operating power in a more smooth manner. Further, when the position of the locating pin 12 in the horizontal plane in the X- and Y-direction is determined, the supply of compressed air to the brake units 20, 27 correlated in the X-and Y-direction among the brake units 20, 27, 32, which are independent for each operating freedom of the locator jigs 9A to 9E and 10A to 10E is interrupted to be brought into the braking, restricted condition again. As such, the locating pin 12 is positioned and restricted in a proper position in conjunction with the X- and Y-direction.

In a consecutive step, the autonomous operation of the jig change-over unit 64 allows the locator jigs 9A to 9E and 10A to 10E to be raised such that the locating pin 12 is positioned to a height position (in the Z-direction) required for positioning and supporting the vehicle body of the subsequent vehicle's model until the positioning operation is completed. When this occurs, the brake unit 32 related in the Z-direction is brought into the braked and restricted condition to cause the locating pin 12 to be positioned in the restricted state. Thus, the locating pins 12 of the respective locator jigs 9A to 9E and 10A to 10E are changed over in the three dimensional position required for positioning and supporting the vehicle body of the subsequent vehicle's model.

In addition, returning the swing arm 69 from the coupling position P1 to the uncoupled position P2 with the autonomous operation of the change-over unit 64 while releasing the mechanical coupling between the locator jigs 9A to 9E and 10A to 10E allows the socket portion 68 to be removed from the relevant locating pin 12 and moved into the original starting position.

With the aforementioned positioning steps, the change-over operations of the jigs are completed at the jig change-over stage Sj while uncoupling the joint members of the compressed air supply unit 100 and the electric power supply unit 110 in the transfer truck 5. Thereafter, the transfer truck 5 is transferred to the panel supply stage Ss, i.e. the starting end section of the floor main multiple striking line as seen in FIG. 1, whereas the jig change-over stage Sj is supplied with the subsequent transfer truck 5 with the following sequential steps being repeatedly implemented in the same manner as discussed above.

By the above described structure, an important advantage of the vehicle body transfer machine of the present embodiment concerns a capability of changing the two-dimensional position of the locating pin within a horizontal plane first and subsequently changing the position of the locating pin in the height direction without causing the locating pin to be moved in the three-dimensional direction at one operation. Thus, no air cylinder, that would otherwise required in the related art practice, is required for restoring the locating pin at the original positions independent from one another with the operating freedom in the three axes. This results in a simplified structure. Also, since no excessive force is applied to the sliding portions associated with the operating freedom in orthogonal three axes, it is possible for the locating pin to be shifted in an extremely smooth and reliable manner, with a resultant remarkable improvement over the positioning precision of the locating pin.

Also, another advantage of the vehicle body transfer machine of the present embodiment concerns a capability of moving the socket portion in a direction to be brought into engagement with the locating pin after rendering the lock units, associated with two horizontal directions involving the X- and Y-directions, to be unlocked such that, even with the presence of an error in the relative position between the socket portion and the locating pin, the error in the relative position is corrected through a self-centering function to obtain a reliable engagement of these components with a resultant increase in the operating reliability of the machine.

Also, another advantage of the vehicle body transfer machine of the present embodiment concerns a capability of moving the locating pin in the horizontal plane in the X- and Y-directions after lowering the locator jig to its lowermost position whereby no excessive force is exerted to the sliding portions enabling the operating freedom to allow the locating pin to move in a remarkably smooth and stable manner for thereby significantly improving the positioning precision of the locating pin.

Also, another advantage of the vehicle body transfer machine of the present embodiment concerns a capability of changing over the position of the locating pin in the vertical direction after the change-over of the position of the locating pin in the horizontal two directions, i.e. the X- and Y-directions has been completed and thereafter the lock units associated with the horizontal two directions have been brought into locked state again whereby when changing over the position of the locating pin in the vertical direction, no displacement is encountered in the position of the locating pin in the X- and Y-directions with a resultant improvement in positioning precision of the locating pin.

Also, another advantage of the vehicle body transfer machine of the present embodiment concerns the presence of the work-piece seating detection unit, located at the work-piece seating surface of the locating pin, which allows a substantially regional area of the locating pin to have the positioning function as well as the seating state detecting function. Consequently, the presence of preliminarily standardized size in the locating pins and the locating bores allows the locating pin and the work-piece seating detection unit to be used commonly for the body panels of plural vehicle's models which are different from one another to provide an highly improved general-purpose property.

Also, another advantage of the vehicle body transfer machine of the present embodiment concerns the work-piece seating detection unit which also functions as a detecting unit for detecting a completed engagement between the socket portion and the relevant locating pin, with the completed engagement between these components being confirmed for every engagement step to highly improve an operating reliability.

Also, another advantage of the vehicle body transfer machine of the present embodiment concerns the work-piece seating detection unit which enables a mechanical detection of the presence of a seated condition of the work-piece using the detection pin adapted to protrude or retract depending on seating or unseating of the body panel or the socket portion for enabling a reliable detection of the seating condition of the work-piece to provide an improved reliability in the work-piece seating detection property.

And also, another advantage of the vehicle body transfer machine of the present embodiment concerns the presence of the clamp unit internally located in the locating pin for clamping the vehicle body panel to allow the locating pin to intensively have the locating-pin function, the work-piece seating detecting function and the panel claming function in one piece with a resultant further miniaturized structure in the locating pin with a reduced space thereof.

The entire content of a Patent Application No. TOKUGAN 2001-068039 with a filing date of Mar. 12, 2001 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A vehicle body transfer machine transferring a vehicle body along a transfer path by using a transfer truck with which the vehicle body is supported, the transfer truck being returned to an initial starting position of the transfer path for a repeated use when transfer of the vehicle body is terminated, the vehicle body transfer machine comprising:

a jig change-over stage located before the initial starting position of the transfer path;

a plurality of locator jigs respectively mounted on the transfer truck in spaced relationship to each other, each of the plurality of locator jigs including an upwardly directed locating pin to position the vehicle body and having operating freedoms in orthogonal three axes involving horizontal two directions of X- and Y-directions and a vertical direction of a Z-direction to respectively alter a three-dimensional position of the locating pin, and a plurality of lock units being attached to each of the plurality of locator jigs to restrict the operating freedoms thereof so as to lock the locating pin at the three-dimensional position;

an unlock-operating unit connected to the jig change-over stage to unlock-operate the plurality of lock units when the transfer truck is positioned in the jig change-over stage; and a jig change-over unit mounted on the jig change-over stage, the jig change-over unit being associated with corresponding one of the plurality of locator jigs to allow the operating freedoms thereof to be utilized for changing over the three-dimensional position of the locating pin of the corresponding one of the plurality of locator jigs to an arbitral three-dimensional position, while the unlock-operating unit being actuated to unlock-operate the plurality of lock units of the corresponding one of the plurality of locator jigs, wherein the jig change-over unit includes a socket portion engageable with the locating pin of the corresponding one of the plurality of locator jigs, the socket portion being moveable toward the locating pin to be brought into engagement therewith under a first unlock condition established when the unlock-operating unit unlock-operates the plurality of lock units, which is correlated with the horizontal two directions, of the corresponding one of the plurality of locator jigs to perform a relative positioning in the two horizontal directions between the jig change-over unit and the corresponding one of the plurality of locator jigs.

2. A vehicle body transfer machine according to claim 1, wherein the jig change-over unit includes a coupling unit mechanically coupling the corresponding one of the plurality of locator jigs thereto to move the corresponding one of the plurality of locator jigs in the vertical direction upon completion of the relative positioning in the two horizontal directions between the jig change-over unit and the corresponding one of the plurality of locator jigs.

3. A vehicle body transfer machine according to claim 2, wherein the jig change-over unit moves the locating pin of the corresponding one of the plurality of locator jigs to the lowest limit position after a second unlock condition of the plurality of lock units of the corresponding one of the plurality of locator jigs is further established to change over a position of the locating pin in the two horizontal directions, the second unlock condition being established when the unlock-operating unit further unlock-operates one lock unit, which is correlated with the vertical direction, of the plurality of lock units.

4. A vehicle body transfer machine according to claim 3, wherein the jig change-over unit changes over the position of the locating pin of the corresponding one of the plurality of locator jigs in the vertical direction after the position of the locating pin in the two horizontal directions is changed over and also the plurality of lock units restrict the operating freedoms of the corresponding one of the plurality of locator jigs in the two horizontal directions to lock the locating pin at a horizontal position.

5. A vehicle body transfer machine according to claim 1, wherein the locating pin has a base portion formed with a work-piece seating surface, and a work-piece seating state detection unit is further provided to detect a presence of the vehicle body seated on the work-piece seating surface.

6. A vehicle body transfer machine according to claim 5, wherein the work-piece seating state detection unit also serves as a detection unit detecting completed engagement between the socket portion of the jig change-over unit and the locating pin of the corresponding one of the plurality of locator jigs.

7. A vehicle body transfer machine according to claim 6, wherein the work-piece seating state detection unit includes a detection pin which is allowed to protrude from and retract from the work-piece seating surface to detect the presence of the vehicle body seated on the work-piece seating surface or the socket portion seated on the work-piece seating surface, in response to protruding and retracting movements of the detection pin caused by unseated operation or seated operation thereof.

8. A vehicle body transfer machine according to claim 7, wherein the locating pin includes a clamp unit clamping the vehicle body which is positioned with the locating pin.

9. A vehicle body transfer machine transferring a vehicle body along a transfer path by using a transfer truck with which the vehicle body is supported, the transfer truck being returned to an initial starting position of the transfer path for a repeated use when transfer of the vehicle body is terminated, the vehicle body transfer machine comprising:

a jig change-over stage located before the initial starting position of the transfer path, a plurality of locator jigs respectively mounted on the transfer truck in spaced relationship to each other, each of the plurality of locator jigs including an upwardly directed locating pin to position the vehicle body and having operating freedoms in orthogonal three axes involving horizontal two directions of X- and Y-directions and a vertical direction of a Z-direction to respectively alter a three-dimensional position of the locating pin, and a plurality of lock units being attached to each of the plurality of locator jigs to restrict the operating freedoms thereof so as to lock the locating pin at the three-dimensional position;

unlock-operating means for unlock-operating the plurality of lock units when the transfer truck is positioned in the jig change-over stage; and jig change-over means for changing over the three-dimensional position of the locating pin of corresponding one of the plurality of locator jigs to an arbitral three-dimensional position, while the unlock-operating means being actuated to unlock-operate the plurality of lock units of the corresponding one of the plurality of locator jigs, wherein the jig change-over means includes socket means for engaging with the locating pin of the corresponding one of the plurality of locator jigs, the socket means being moveable toward the locating pin to be brought into engagement therewith under a unlock condition established when the unlock-operating means unlock-operates the plurality of lock units, which is correlated with the horizontal two directions, of the corresponding one of the plurality of locator jigs to perform a relative positioning in the two horizontal directions between the jig change-over means and the corresponding one of the plurality of locator jigs.

10. A method transferring a vehicle body along a transfer path by using a transfer truck with which the vehicle body is supported, the transfer truck being returned to an initial starting position of the transfer path for a repeated use when transfer of the vehicle body is terminated, the method comprising:

providing a jig change-over stage located before the initial starting position of the transfer path, providing a plurality of locator jigs respectively mounted on the transfer truck in spaced relationship to each other, each of the plurality of locator jigs including an upwardly directed locating pin to position the vehicle body and having operating freedoms in orthogonal three axes involving horizontal two directions of X- and Y-directions and a vertical direction of a Z-direction to respectively alter a three-dimensional position of the locating pin, and a plurality of lock units being attached to each of the plurality of locator jigs to restrict the operating freedoms thereof so as to lock the locating pin at the three-dimensional position;

providing a jig change-over unit mounted on the jig change-over stage, the jig change-over unit being associated with corresponding one of the plurality of locator jigs to allow the operating freedoms thereof to be utilized for changing over the three-dimensional position of the locating pin of the corresponding one of the plurality of locator jigs;

positioning the transfer truck in the jig change-over stage;

unlock-operating the plurality of lock units of each of the plurality of locator jigs when the transfer truck is positioned in the jig change-over stage; and changing over the three-dimensional position of the locating pin of each of the plurality of locator jigs to an arbitral three-dimensional position by using the jig change-over unit, while unlock-operating the plurality of lock units of each of the plurality of locator jigs, wherein the jig change-over unit is moved toward the locating pin of the corresponding one of the plurality of locator jigs to be brought into engagement therewith under a unlock condition, which is established by unlock-operating the plurality of lock units, which is correlated with the horizontal two directions, of the corresponding one of the plurality of locator jigs to perform a relative positioning in the two horizontal directions between the jig change-over unit and the corresponding one of the plurality of locator jigs.

* * * * *